United States Patent
Wu

(10) Patent No.: US 11,829,268 B2
(45) Date of Patent: Nov. 28, 2023

(54) DATA RECOVERY MANAGEMENT FOR MEMORY

(71) Applicant: Micron Technology, Inc., Boise, ID (US)

(72) Inventor: Minjian Wu, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 25 days.

(21) Appl. No.: 17/046,279

(22) PCT Filed: Oct. 25, 2019

(86) PCT No.: PCT/CN2019/113306
§ 371 (c)(1),
(2) Date: Oct. 8, 2020

(87) PCT Pub. No.: WO2021/077407
PCT Pub. Date: Apr. 29, 2021

(65) Prior Publication Data
US 2023/0153215 A1    May 18, 2023

(51) Int. Cl.
*G06F 11/20*        (2006.01)
*G06F 3/06*         (2006.01)

(52) U.S. Cl.
CPC ........ *G06F 11/2017* (2013.01); *G06F 3/0619* (2013.01); *G06F 3/0656* (2013.01); *G06F 3/0659* (2013.01); *G06F 3/0679* (2013.01); *G06F 2201/805* (2013.01)

(58) Field of Classification Search
CPC .. G06F 11/2017; G06F 3/0619; G06F 3/0656; G06F 3/0659; G06F 2201/805
See application file for complete search history.

(56) References Cited

U.S. PATENT DOCUMENTS

| 10,643,722 | B2 * | 5/2020 | Chih ..................... G11C 16/26 |
| 11,113,202 | B2 * | 9/2021 | Jung ................... G06F 12/0246 |
| 2015/0046747 | A1 | 2/2015 | Gaertner et al. |
| 2015/0317274 | A1 | 11/2015 | Arroyo et al. |

FOREIGN PATENT DOCUMENTS

| CN | 1696906 A | 11/2005 |
| CN | 108809689 A | 11/2018 |

OTHER PUBLICATIONS

International Search Report and Written Opinion received for PCT Patent Application No. PCT/CN2019/113306, dated Jul. 8, 2020, 7 pages.

* cited by examiner

*Primary Examiner* — Nadeem Iqbal
(74) *Attorney, Agent, or Firm* — Holland & Hart LLP

(57) ABSTRACT

A memory device and method of operation are described. The memory device may include NAND memory. The memory device may configure a host device to maintain a host-side buffer for data backup. When the memory device determines an error associated with attempting to write data to a page of memory in a memory block, the memory device may indicate the error to the host device. The host device may, based on receiving the indication of the error, transmit to the memory device a backup copy of the data and other impacted data from the circular buffer. The memory device may configure the host-side buffer to have at least a particular size based one or more structural or operational aspects of the memory device.

25 Claims, 10 Drawing Sheets

DATA RECOVERY MANAGEMENT FOR MEMORY

CROSS REFERENCE

The present application for patent is a 371 national phase filing of International Patent Application No. PCT/CN2019/113306 by W U et al., entitled "DATA RECOVERY MANAGEMENT FOR MEMORY," filed Oct. 25, 2019, assigned to the assignee hereof, and expressly incorporated by reference herein.

BACKGROUND

The following relates generally to a system that includes at least one memory device and more specifically to data recovery management for memory.

A system may include various kinds of memory devices and controllers that are coupled via one or more buses to manage information in numerous electronic devices such as computers, wireless communication devices, internet of things, cameras, digital displays, and the like. Memory devices are widely used to store information in such electronic devices. Information is stored by programing different states of a memory cell. For example, binary memory cells may store one of two states, often denoted by a logic "1" or a logic "0." Some memory cells are capable of storing one of more than two states. To access the stored information, the memory device may read, or sense, the stored state in the memory cell. To store information, the memory device may write, or program, the state to the memory cell.

Various types of memory devices exist, including magnetic hard disks, random access memory (RAM), read only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D Xpoint), Flash memory (such as floating-gate Flash and charge-trapping Flash, which may be used in not-or (NOR) or not-and (NAND) memory devices), and others. Memory devices may be volatile or non-volatile. Non-volatile memory cells, e.g., such as Flash memory cells, may maintain their stored logic state for extended periods of time even in the absence of an external power source. Volatile memory cells, e.g., DRAM cells, may lose their stored state over time unless they are periodically refreshed by an external power source. Flash-based memory devices may have improved performance compared to some non-volatile and volatile memory devices.

DETAILED DESCRIPTION

Figure 1:
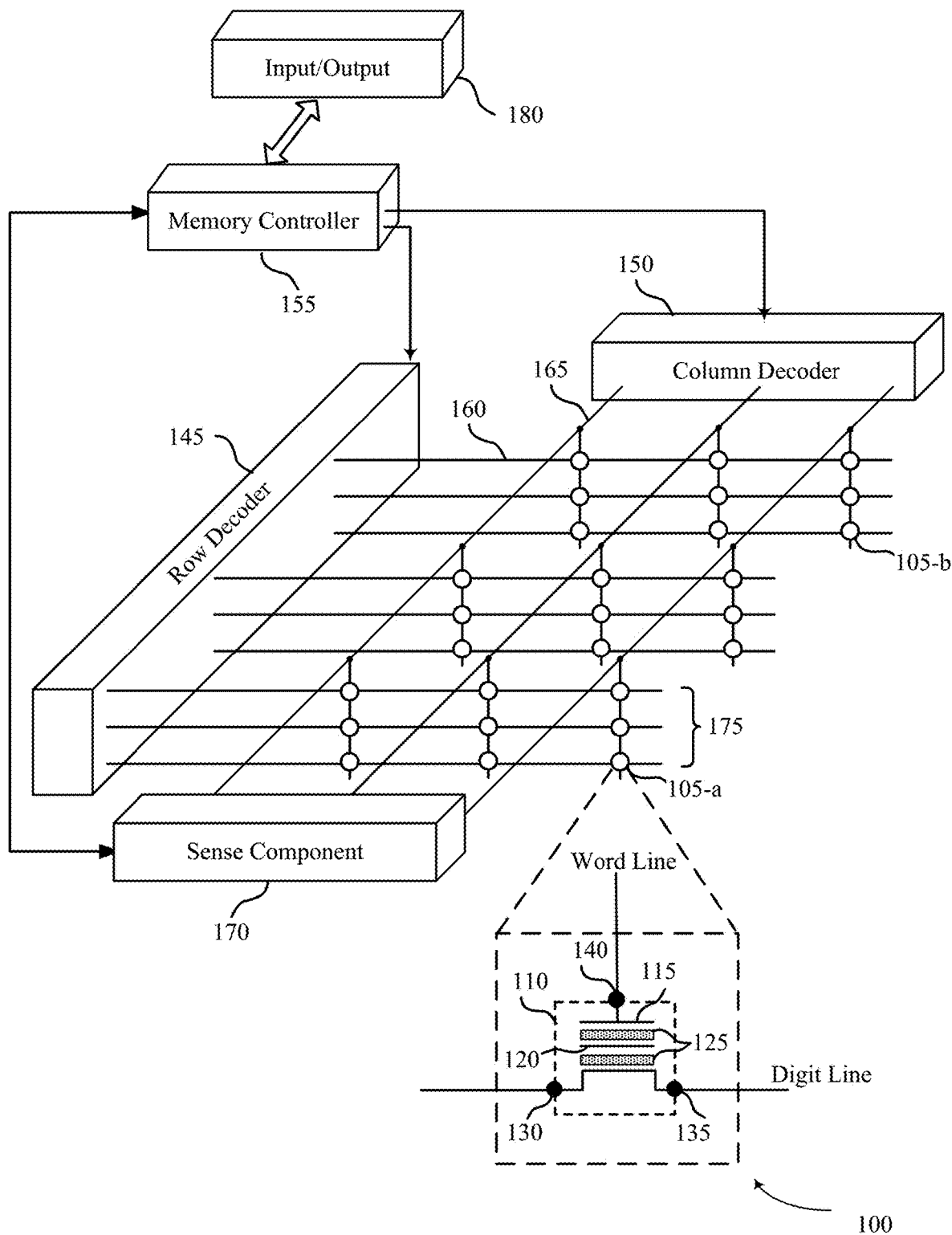
FIG. 1 illustrates an example of a memory device that supports data recovery management for memory in accordance with examples as disclosed herein.

Some memory cells may each store one of two or more logic states. For example, a single-level memory cell (SLC) may store one of two logic states, and a multiple-level memory cell may store one of three or more logic states. In some cases, each SLC may store a single bit of information, which may be included in a single page of data. In some cases, each multiple-level cell may store multiple bits of information, and each bit may be included in a different page of data. For example, a first bit of information stored in a multiple-level cell may be included in a lower page of data and a second bit of information stored in the same multiple-level cell maybe included in an upper page of data.

Some memory cells, such as Flash memory cells, may store a logic state by storing an amount of charge that represents the logic state. For example, an SLC may be programmed by storing an amount of charge that is either above or below a threshold, indicating either a first logic state or a second logic state. In some memory architectures, such as 3D NAND memories, a failed write operation on one SLC cell may corrupt data stored by one or more other SLC cells in the same block, thereby increasing the severity of the failure.

Some multiple-level Flash memory cells may be programmed (e.g., written) with appropriate logic states using multiple "passes," in which each pass may add an amount of charge stored on some of the memory cells (depending on the logic state to be stored on each memory cell) until the amount of stored charge reaches a level that represents the desired logic state. For multiple-level cells, a first pass may place a first amount of charge on memory cells that have a first bit that is included in a lower page, and a second pass may place additional charge on the memory cells that have a second bit that is included in an upper page.

In some cases, a failed write operation on one page (e.g., an upper page) of data may corrupt data stored in another page (e.g., a lower page). For example, a failed second-pass write operation on a multiple-level cell in an upper page may corrupt data previously stored in a first pass in a lower page that includes the same cell.

Write failures for memory cells may be particularly problematic in high-reliability systems, such as automotive or other safety-critical systems. Thus, in some cases, a memory system may keep a local backup copy of stored information in case of a write failure, such as by keeping a copy of the data in random access memory (RAM) within the memory device or in another bank of SLC memory. In this case, the memory device may be able to restore the correct logic states to the affected memory cells. Such an approach may have drawbacks, for example, such as higher cost, slower write speeds, and higher write amplification (e.g., additional unnecessary writes that may decrease the longevity of the memory device). Further, internal RAM within the memory device may be very limited, at least with respect to an amount of which may be allocated to maintain a backup copy of data.

To address these or other shortcomings, as described herein, a memory device may configure a host device (such as an external microprocessor) to maintain a circular buffer (e.g., at the host device) for keeping a copy of recently written data in case of write failures at the memory device. In this case, the memory device may notify the host device of a write failure in a block of memory cells, may receive backup data from the circular buffer as maintained by the host device, and may re-write the received backup data to a different block of memory cells. In some cases, a memory device may determine the size of the circular buffer based on the maximum quantity of data that may be corrupted by a failed write operation, possibly in addition to other factors, and may indicate the size of the circular buffer to the host device.

Features of the disclosure are initially described in the context of a memory device and memory circuit as described with reference to FIGS. 1 and 2. These and other features of the disclosure are further illustrated by and described with reference to system diagrams, process flows, and flowcharts that relate to data recovery management for memory as described with references to FIGS. 3-10.

Figure 2:
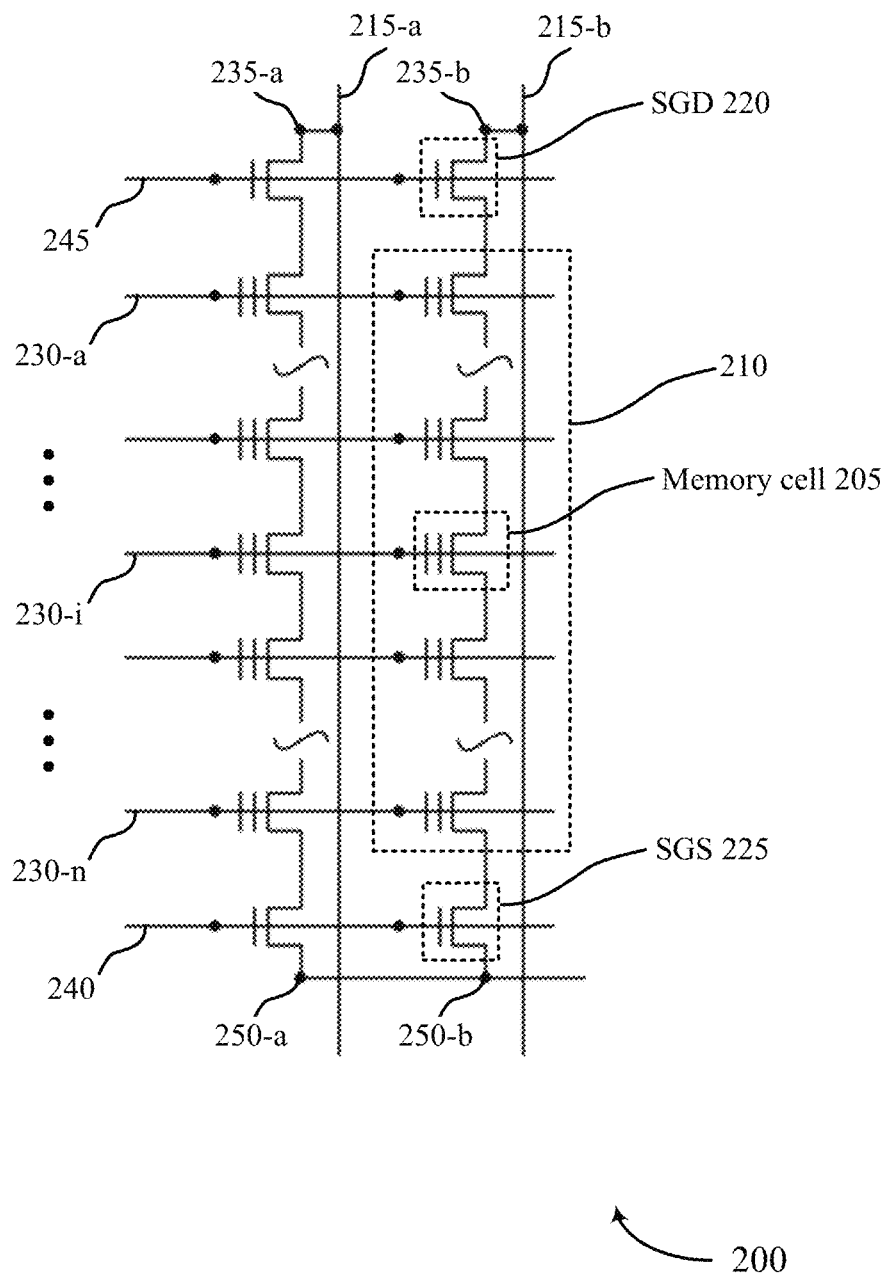
FIG. 2 illustrates an example of a NAND memory circuit that supports data recovery management for memory in accordance with examples as disclosed herein.

FIG. 1 illustrates an example of a memory device 100 in accordance with examples as disclosed herein. In some cases, the memory device 100 may be referred to as a memory chip, a memory die, or an electronic memory apparatus. The memory device 100 may include one or more memory cells, such as memory cell 105-a and memory cell 105-b (other memory cells are unlabeled). A memory cell 105 may be, for example, a Flash memory cell (such as in the blow-up diagram of memory cell 105-a shown in FIG. 1), a DRAM memory cell, an FeRAM memory cell, a PCM memory cell, or another type of memory cell.

Each memory cell 105 may be programmed to store a logic state representing one or more bits of information. In some cases, a memory cell 105 may store one bit of information at a time (e.g., a logic state 0 or a logic state 1), such as in the memory cells of SLC memory blocks, which may be referred to as SLC memory cells. In some cases, a single memory cell 105 may store more than one bit of information at a time, such as in multi-level cells (MLCs), tri-level cells (TLCs), or quad-level cells (QLCs). For example, a single MLC memory cell 105 may store two bits of information at a time by storing one of four logic states: logic state 00, logic state 01, logic state 10, or a logic state 11. For example, a single TLC memory cell 105 may store three bits of information at a time by storing one of eight logic states: 000, 001, 010, 011, 100, 101, 110, 111. And as another example, a single QLC memory cell 105 may store four bits of information at a time by storing one of sixteen logic states.

In some cases, a multiple-level memory cell 105 (e.g., an MLC memory cell, TLC memory cell, or QLC memory cell) may be physically different than an SLC cell. For example, a multiple-level memory cell 105 may use a different cell geometry or be fabricated using different materials. In some cases, a multiple-level memory cell 105 may be physically the same or similar to an SLC cell, and other circuitry in a memory block (such as controller circuitry, sense amplifiers, drivers, etc.) may be configured to operate (e.g., read and write) the memory cell as an SLC cell, an MLC cell, a TLC cell, etc.

Different memory cell architectures may store a logic state in different ways. In FeRAM architectures, for example, each memory cell 105 may include a capacitor that includes a ferroelectric material to store a charge and/or a polarization representative of the programmable state. In DRAM architectures, each memory cell 105 may include a capacitor that includes a dielectric material (e.g., an insulator) to store a charge representative of the programmable state.

In Flash memory architectures, each memory cell 105 may include a transistor that has a floating gate and/or a dielectric material for storing a charge representative of the logic state. For example, the blow-up diagram of memory cell 105-a in FIG. 1 is a Flash memory cell that includes a transistor 110 (e.g., a metal-oxide-semiconductor (MOS) transistor) that may be used to store a logic state. The transistor 110 has a control gate 115 and may include a floating gate 120 that is sandwiched between dielectric material 125. Transistor 110 includes a first node 130 (e.g., a source or drain) and a second node 135 (e.g., a drain or source). A logic state may be stored in transistor 110 by placing (e.g., writing, storing) a quantity of electrons (e.g., a charge) on floating gate 120. The amount of charge to be stored on the floating gate 120 may depend on the logic state to be stored. The charge stored on floating gate 120 may affect the threshold voltage of transistor 110, thereby affecting the amount of current that may flow through transistor 110 when transistor 110 is activated. The logic state stored in transistor 110 may be read by applying a voltage to the control gate 115 (e.g., at control node 140) to activate transistor 110 and measuring (e.g., detecting, sensing) the resulting amount of current that flows between the first node 130 and the second node 135.

For example, a sense component 170 may determine whether an SLC memory cell stores a logic state 0 or a logic state 1 in a binary manner; e.g., based on the presence or absence of a current from the memory cell, or based on whether the current is above or below a threshold current. For multiple-level cells, however, a sense component 170 may determine the logic state stored in the memory cell based on various intermediate levels of current. For example, a sense component 170 may determine the logic state of a TLC cell based on eight different levels of current (or ranges of current) that define the eight potential logic states that could be stored by the TLC cell. Such levels of current may be fairly closely spaced (in terms of magnitude), providing a lower margin for error than in the SLC case.

Similarly, a Flash SLC memory cell may be written by applying one of two voltages (e.g., a voltage above a threshold or a voltage below a threshold) to the memory cell to store (or not store) an electric charge on the floating gate representing one of the two possible logic states. In contrast, writing to a Flash multiple-level cell may require applying voltages at a finer level of granularity (and possibly in multiple passes) to more finely control the amount of charge stored on the floating gate, thereby enabling a larger set of logic states to be represented.

A charge-trapping Flash memory cell may operate in a manner similar to that of a floating-gate Flash memory cell, but instead of (or in addition to) storing a charge on a floating gate 120, a charge-trapping Flash memory cell may store a charge representing the state in a dielectric material below the control gate 115. Thus, a charge-trapping Flash memory cell may or may not include a floating gate 120.

In some examples, each row of memory cells 105 is connected to a word line 160 and each column of memory cells 105 is connected to a digit line 165. Thus, one memory cell 105 may be located at the intersection of a word line 160 and a digit line 165. This intersection may be referred to as a memory cell's address. Digit lines are sometimes referred to as bit lines. In some cases, word lines 160 and digit lines 165 may be substantially perpendicular to one another and may create an array of memory cells 105. In some cases, word lines 160 and digit lines 165 may be generically referred to as access lines or select lines.

In some cases, memory device 100 may include a three-dimensional (3D) memory array, where two-dimensional (2D) memory arrays are formed on top of one another. This may increase the quantity of memory cells that may be placed or created on a single die or substrate as compared with 2D arrays, which in turn may reduce production costs, or increase the performance of the memory array, or both. In the example of FIG. 1, memory device 100 includes multiple levels of memory arrays. The levels may, in some examples, be separated by an electrically insulating material. Each level may be aligned or positioned so that memory cells 105 may be aligned (exactly, overlapping, or approximately) with one another across each level, forming memory cell stack 175. In some cases, memory cell stack 175 may be referred to as a string of memory cells, discussed in more detail with reference to FIG. 2.

Accessing memory cells 105 may be controlled through row decoder 145 and column decoder 150. For example, row decoder 145 may receive a row address from memory controller 155 and activate an appropriate word line 160 based on the received row address. Similarly, column decoder 150 may receive a column address from memory controller 155 and activate an appropriate digit line 165. Thus, by activating one word line 160 and one digit line 165, one memory cell 105 may be accessed.

Upon accessing, memory cell 105 may be read, or sensed, by sense component 170. For example, sense component 170 may be configured to determine the stored logic state of memory cell 105 based on a signal generated by accessing memory cell 105. The signal may include a voltage or electrical current, or both, and sense component 170 may include voltage sense amplifiers, current sense amplifiers, or both. For example, a current or voltage may be applied to a memory cell 105 (using the corresponding word line 160 and/or digit line 165) and the magnitude of the resulting current or voltage on the digit line 165 may depend on the logic state stored by the memory cell 105. For example, for a Flash memory cell, the amount of charge stored on a floating gate or in an insulating layer of a transistor in the memory cell 105 may affect the threshold voltage of the transistor, thereby affecting the amount of current that flows through the transistor in the memory cell 105 when the memory cell 105 is accessed. Such differences in current may be used to determine the logic state stored on the memory cell 105.

Sense component 170 may include various transistors or amplifiers in order to detect and amplify a signal (e.g., a current or voltage) on a digit line 165. The detected logic state of memory cell 105 may then be output via input/output block 180. In some cases, sense component 170 may be a part of column decoder 150 or row decoder 145, or sense component 170 may otherwise be connected to or in electronic communication with column decoder 150 or row decoder 145.

A memory cell 105 may be set or written by similarly activating the relevant word line 160 and digit line 165 to enable a logic state (e.g., representing one or more bits of information) to be stored in the memory cell 105. Column decoder 150 or row decoder 145 may accept data, for example from input/output block 180, to be written to the memory cells 105. As previously discussed, in the case of Flash memory (such as Flash memory used in NAND and 3D NAND memory devices) a memory cell 105 is written by storing electrons in a floating gate or an insulating layer.

Memory controller 155 may control the operation (e.g., read, write, re-write, refresh) of memory cells 105 through the various components, for example, row decoder 145, column decoder 150, and sense component 170. In some cases, one or more of row decoder 145, column decoder 150, and sense component 170 may be co-located with memory controller 155. Memory controller 155 may generate row and column address signals in order to activate the desired word line 160 and digit line 165. Memory controller 155 may also generate and control various voltages or currents used during the operation of memory device 100.

In some cases, memory controller 155 may write first data to a first page of memory cells within a first set of pages of memory cells at a memory device. Memory controller 155 may receive, from a host device, a write command for second data and attempting to write the second data to a second page of memory cells within the first set of pages. Memory controller 155 may identify an error associated with attempting to write the second data to the second page within the first set of pages and indicate the error to the host device. Memory controller 155 may receive, from the host device after indicating the error, a copy of the first data and a copy of the second data, and write the copy of the first data to a first page of memory cells within a second set of pages of memory cells at the memory device and the copy of the second data to a second page of memory cells within the second set of pages FIG. 2 illustrates an example of NAND memory circuit 200 that supports data recovery management for memory in accordance with examples of the present disclosure. NAND memory circuit 200 may be an example of a portion of a memory device, such as memory device 100. Although some elements included in FIG. 2 are labeled with reference numbers, other corresponding elements are not labeled, though they are the same or would be understood to be similar, in an effort to increase visibility and clarity of the depicted features.

NAND memory circuit 200 includes multiple Flash memory cells 205 (which may be, for example, Flash memory cells such as described with reference to FIG. 1) connected in a NAND configuration. In a NAND memory configuration (referred to as NAND memory), multiple Flash memory cells 205 are connected in series with each other to form strings 210 of memory cells 205, in which the drain of each Flash memory cell 205 in the string 210 is coupled with the source of another Flash memory cell 205 in the string. In some cases, Flash memory cells that are connected in a NAND configuration to form a NAND memory may be referred to as NAND memory cells.

Each string 210 of memory cells 205 may be associated with a corresponding digit line 215 that is shared by the memory cells 205 in the string 210. Each memory cell 205 in a string 210 may be associated with a separate word line 230 (e.g., word line 230-*a*, 230-*i*, 230-*n*), such that the quantity of word lines 230 may be equal to the quantity of memory cells 205 in a string 210.

In general, NAND memory may be hierarchically organized as strings 210 that include multiple memory cells 205, pages that include multiple strings 210, and blocks that include multiple pages. In some cases, NAND memory can be written to and read from at the page level of granularity, but may not be erasable at the page level of granularity. For example, NAND memory may instead be erasable at a higher level of granularity, such as at the block level of granularity. In some cases, a NAND memory cell may need to be erased before it can be re-written. Different memory devices may have different read/write/erase characteristics.

In some cases, a single memory cell 205 may be included in a single page. In other cases, a single memory cell 205 may be included in two or more pages. For example, a multiple-level cell that is configured to store two bits may be included in two pages, with each bit included in a different page.

Each string 210 of memory cells 205 in NAND memory circuit 200 is coupled with a select gate device for drain (SGD) transistor 220 at one end of the string 210 and a select gate device for source (SGS) transistor 225 at the other end of the string 210. SGD transistor 220 and SGS transistor 225 may be used to couple a string 210 of memory cells 205 to a bit line 215 and/or to a source node 250 by applying a voltage at the gate 245 of SGD transistor 225 and/or at the gate 240 of SGS transistor 225, respectively.

During NAND memory operations, various voltage levels associated with source node 250, gate 240 of an SGS transistor 225 associated with source node 250, word lines 230, drain node 235, gate 245 of an SGD transistor 220 associated with drain node 235, and bit line 215 may be applied to perform one or more operations (e.g., program, erase, or read) on at least some NAND memory cells in a string 210.

In some cases, during a first operation (e.g., a read operation), a positive voltage may be applied to bit line 215 connected to drain node 235 whereas source node 250 may be connected to a ground or a virtual ground (e.g., approximately 0 V). For example, the voltage applied to drain node 235 may be 1 V. Concurrently, voltages applied to gates 245 and 240 may be increased above the threshold voltages of the one or more SGSs 225 associated with source node 250 and the one or more SGDs 220 associated with drain node 235, such that a channel associated with memory string 210 may be electrically connected to drain node 235 and source node 250. A channel may be an electrical path through the memory cells 205 in a string 210 (e.g., through the transistors in the memory cells 205) that may conduct current under certain operating conditions.

Concurrently, multiple word lines 160 (e.g., in some cases all word lines 160 except a selected word line (i.e., word lines associated with unselected cells in string 210) may be connected to a voltage (e.g., VREAD) that is higher than the highest threshold voltage (VT) of memory cells in string 210. VREAD may cause all of the unselected memory cells in string 210 to turn "ON" so that each unselected memory cell can maintain high conductivity in a channel associated with it. In some examples, a word line 160 associated with a selected cell may be connected to a voltage, VTarget. VTarget may be selected at a value between VT of an erased memory cell and VT of a programmed memory cell in memory string 210. When the selected memory cell exhibits an erased VT (e.g., VTarget>VT of the selected memory cell), the selected memory cell 205 may turn "ON" in response to the application of VTarget and thus allow a current to flow in the channel of memory string 210 from bit line 215 to source 250. When the selected memory cell exhibits a programmed VT (e.g., hence VTarget<VT of the selected memory cell), the selected memory cell may turn "OFF" in response to VTarget and thus prohibit a current to flow in the channel of memory string 210 from bit line 215 to source 250. The amount of current flow (or lack thereof), may be sensed by sense component 170 as described with reference to FIG. 1 to read stored information in the selected memory cell 205 within string 210.

Figure 3A:
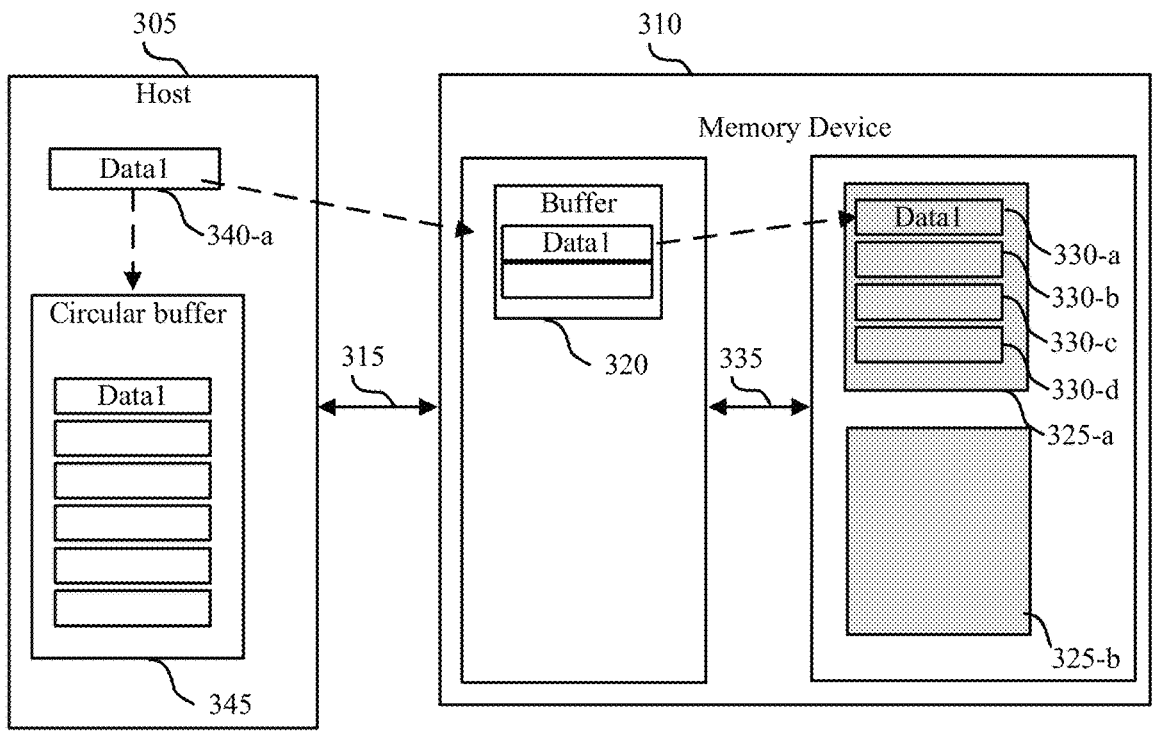
FIGS. 3A and 3B illustrate an example of a system that supports data recovery management for memory in accordance with examples as disclosed herein.
Figure 3B:
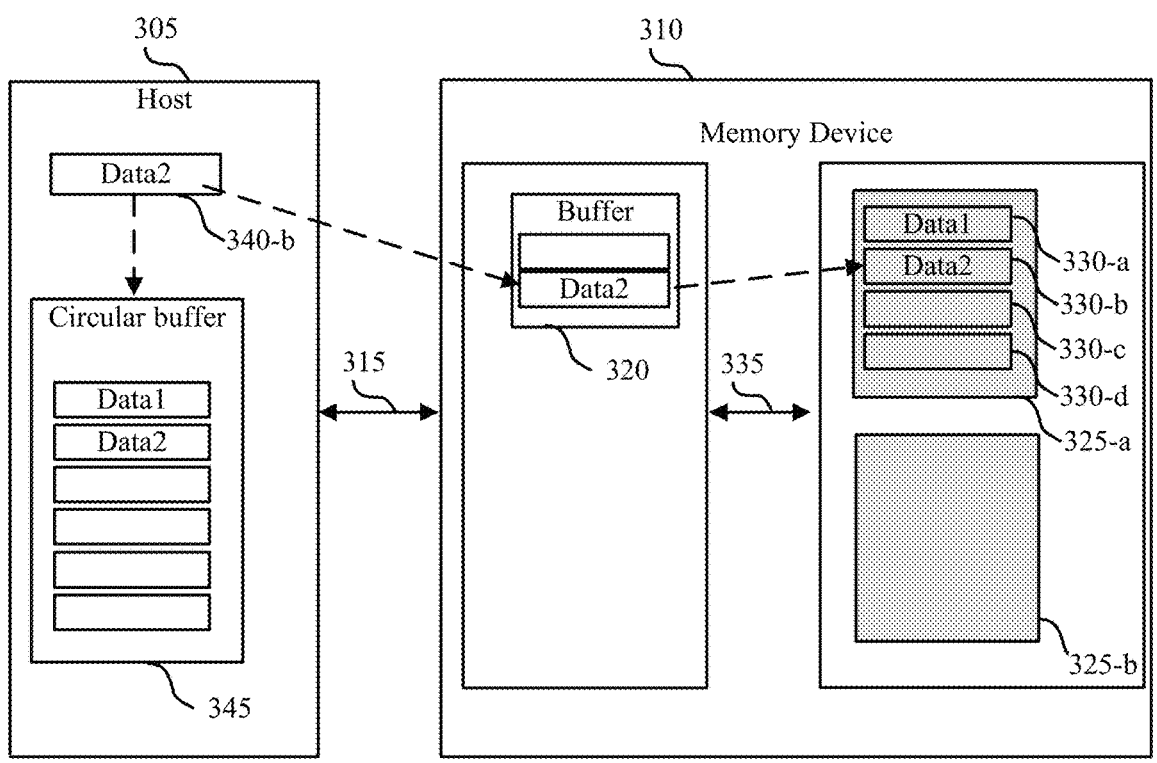

FIGS. 3A and 3B illustrate examples of a system 300 that supports data recovery management for memory in accordance with examples as disclosed herein and depict data flows for the system 300 associated with two write consecutive operations (shown as 300-a and 300-b). System 300 includes a host device 305 and a memory device 310 that may communicate with each other using a bus 315. Memory device 310 may be an example of memory device 100 described with reference to FIG. 1. In some cases, memory device 310 may be a managed memory device that includes Flash memory cells. For example, memory device 310 may be a managed NAND memory device that includes Flash memory cells arranged in a NAND configuration, such as depicted in memory circuit 200 of FIG. 2. In some cases, the Flash memory cells in memory device 310 may include SLC memory cells and/or multiple-level memory cells such as MLC memory cells, TLC memory cells, or QLC memory cells.

Memory device 310 includes an internal buffer 320, which may be a local buffer at memory device 310 (e.g., a buffer located in the same package and/or on the same die as memory cells of memory device 310). In some cases, internal buffer 320 may represent a portion of a larger internal buffer at memory device 310, and internal buffer 320 may be the portion that is allocated by memory device 310 for buffering data received from the host device 305 for writing to memory blocks 325. In some cases, internal buffer 320 may include RAM cells (e.g., Static RAM (SRAM) cells); that is, internal buffer 320 may be (or be a portion of) a RAM buffer.

Memory device 310 may temporarily save (e.g., buffer) data received from host device 305 in internal buffer 320 before writing the data to a memory block 325 by transmitting the data on bus 335, for example. In some cases, internal buffer 320 may be operated as a ping-pong buffer during write operations to memory device 310. A ping-pong buffer may function in a manner similar to a two-entry circular buffer, in which new entries are written to the internal buffer 320 in alternating positions. Internal buffer 320 may be used by memory device 310 to enable overlapping or pipelining of input/output operations (I/O) and memory access operations to increase the speed of memory device 310, as one entry may be read out of internal buffer 320 as an entry is written to internal buffer 320.

Memory device 310 includes multiple memory blocks 325-a and 325-b. In some cases, memory blocks 325 may include Flash memory cells arranged in a NAND configuration, which may be referred to as NAND memory blocks. Each memory block 325 may include a set of pages (such as pages 330-a, 330-b, 330-c, 330-d) of memory.

In some cases, a page 330 may include single-level memory cells, multiple-level memory cells, or both. As previously described, a single multiple-level Flash memory cell (e.g., one multiple-level Flash memory cell) may be included in multiple pages 330, such as when each bit of the multiple-level Flash memory cell is included in a different page. That is, a page 330 may represent a logical partition rather than a physical partition. In some cases, because NAND memory may be written at the page level of granularity, an error in a single memory cell of a page may result in the whole page needing to be re-written.

In some cases, memory device 310 may write first data to a first page of memory and second data to a second page of memory, where one or more memory cells in the first page are also included in the second page. In some cases, a two-pass write operation for writing data to multiple-level Flash memory cells may write two pages of data, a lower page (which may be written during the first pass) and an upper page (which may be written during the second pass, after the first pass). Thus, a multiple-level cell may be programmed in two (or more) passes.

In some cases, host device 305 may identify data 340 (e.g., Data1 340-a, Data2 340-b, etc.) to be written to memory device 310, and may send (e.g., transmit) a write command to memory device 310 to write the data 340 to memory cells of memory device 310. As described in more detail herein, in some cases, host device 305 may also save a temporary backup copy of data 340 in a circular buffer 345 of host device 305.

For example, as depicted by system 300-a, host device 305 may identify Data1 340-a for writing to memory device 310. Host device 305 may save (e.g., write) a backup copy of Data1 340-a to a first entry of a circular buffer 345 and may (e.g., concurrently) transmit a write command that includes Data1 340-a to memory device 310 (e.g., via bus 315). In response to receiving the write command, memory device 310 may write Data1 to block 325-a by saving Data1 340-a in a first entry of internal buffer 320 and then subsequently writing Data1 340-a to a first page 330-a of block 325-a (e.g., from the first entry of internal buffer 320). In some cases, following initialization of the memory device 310 (e.g., the start of a new power cycle for the memory device 310), the memory device 310 may write data associated with the first write command only to a totally empty block 325 and may refrain from writing any additional data during the instant power cycle to any block 325 that was partially programed during the prior power cycle, to avoid impacting any data programmed during the last power cycle.

Similarly, as depicted by system 300-b, host device 305 may subsequently identify Data2 340-b for writing to memory device 310. Host device 305 may save (e.g., write) a backup copy of Data2 340-b in a second entry of circular buffer 345 (which may be, for example, an entry that is consecutive with the entry at which Data1 is saved). Host device 305 may transmit a write command that includes Data2 340-b to memory device 310. In response to receiving the write command, memory device 310 may write Data2 340-b to block 325-a by saving Data2 340-b in a second entry of internal buffer 320 and subsequently writing Data2 340-b to a second page 330-b of block 325-a.

In some cases, if memory device 310 determines that a write error has occurred while memory device 310 is attempting to write data 340 to a page 330 of memory cells in a block 325, memory device 310 may indicate the error to host device 305, such as by sending an error indication to host device 305 (e.g., via bus 315). Host device 305 may, based on receiving the error indication, send some or all of the data from circular buffer 345 (e.g., a copy of Data1 340-a, Data2 340-b, and/or other data) to memory device 310, such as by sending write commands for some or all of the data from circular buffer 345. Memory device 310 may then write (e.g., re-write) the copies of data received from host device 305 to another block 325 of memory, such as memory block 325-b.

In some cases, the size of circular buffer 345 (such as a quantity of entries of circular buffer 345) may be determined by memory device 310 and indicated, by memory device 310, to host device 305.

In some cases, memory device 310 may determine the size of circular buffer 345, which may be based at least in part on the largest quantity of data (such as the largest quantity of pages) that may potentially be corrupted during a write operation and therefore may need to be re-written by memory device 310. For example, for two-pass write operations of a memory cell, if a write error occurs during the first pass (e.g., while the memory device 310 is attempting to write the lower page), the upper page may not be corrupted. If a write error occurs during the second pass (e.g., while the memory device 310 is attempting to write the upper page), however, both the upper page and the lower page may be corrupted, because the same memory cell may be included in both pages. Thus, the size may be based on a maximum number (quantity) of pages that may be impacted by a write error, or on a capacity of a number of memory cells (e.g., memory cells included in pages that may be impacted).

In addition, during or after a write error, memory device 310 may continue to receive new data from host device 305 that is saved in internal buffer 320 in preparation for writing to a memory block 325. Data saved in internal buffer 320 may be lost if memory device 310 cannot write the data in internal buffer 320 to a memory block 325 after a write error. Thus, in some cases, memory device 310 may include the size (e.g., capacity, in terms of pages or bytes) of internal buffer 320 when determining the size of circular buffer 345. That is, memory device 310 may determine the size of circular buffer 345 as also based at least in part on the size of internal buffer 320—e.g., such that the size of circular buffer 345 is no less than the quantity of pages that may be corrupted (e.g., impacted) by a write error in one page 330 multiplied by the page size and added with the size of internal buffer 320.

In some cases, if host device 305 receives an error indication from memory device 310, host device 305 may send all of the data from circular buffer 345 to memory device 310, and memory device 310 may write (e.g., re-write) all of the data received from host device 305 to another block 325 of memory.

In some cases, however, not all of the data in the circular buffer 345 may need to be re-written to memory device 310, such as when some of the data in circular buffer 345 was written to pages of memory device 310 that may not have been impacted by the write error. In this case, re-sending and re-writing all of the data from the circular buffer 345 may introduce unnecessary overhead.

Moreover, Flash memory cells may also support a finite quantity of write cycles during their lifetime, after which they may no longer reliably store a logic state. Thus, it may be desirable to reduce the quantity of unnecessary write operations performed on the memory cells and to avoid re-writing all of the data in circular buffer 345 if only some of the data may be corrupted.

To minimize unnecessary re-writing of data, in some cases, memory device 310 may include, in the error indication, an indication of an address, such as a logical block address (LBA), of a page associated with the write error and a size of the write error (e.g., an error size). For example, memory device 310 may include an address of the page at which the write error occurred and an indication of the quantity of pages (or an indication of the cumulative size of the data written to the quantity of pages) that may need to be re-written to memory device 305 due to the write error. Host device 305 may then send, based on the indication of the address and the size, a portion (e.g., a subset) of the data stored in the circular buffer 345 to memory device 310 for re-writing based on the indication of the address and size. Thus, in some cases, host device 305 may or may not send all of the data in circular buffer 345 to memory device 305 for re-writing, depending on the error size indicated by memory device 305.

In some cases, pages that are or may be impacted by a subsequent write error that occurs at another page (e.g., pages that are operable to be impacted by a subsequent write error at another page) may include pages that share one or more memory cells with the page at which the write error occurred, or intervening pages between the page at which the write error occurred and other pages that may have been corrupted by the write error.

An example of the operation of a memory device 310 and host device 305 when a write error occurs is described in more detail with reference to FIGS. 4 and 5.

Figure 4:
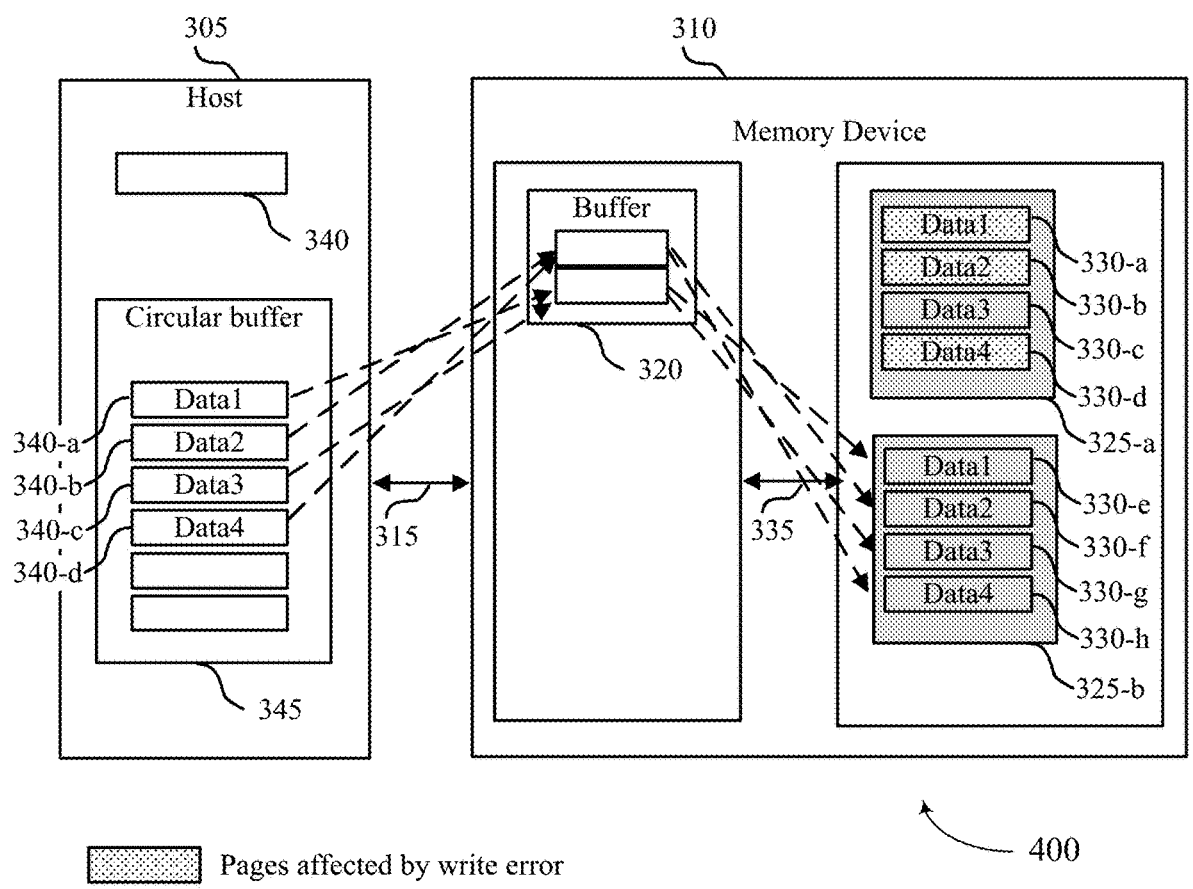
FIG. 4 illustrates an example of a system that supports data recovery management for memory in accordance with examples as disclosed herein.

FIG. 4 illustrates an example of a system 400 that supports data recovery management for memory in accordance with examples as disclosed herein. System 400 may be an example of system 300 (e.g., as shown in systems 300-*a* and 300-*b*) discussed with reference to FIGS. 3A and 3B, and may depict operation of system 400 after a write error is detected.

In system 400, host device 305 may have written Data1 340-*a*, Data2 340-*b*, Data3 340-*c*, and Data4 340-*d* to circular buffer 345, and may have transmitted write commands to memory device 310 to cause memory device 310 to write the same data to block 325-*a*. Memory device 310 may have successfully written Data1 340-*a*, Data2 340-*b*, and Data3 340-*c* to pages 330-*a*, 330-*b*, and 330-*c*, respectively, but may have encountered a write error while attempting to write Data4 340-*d* to page 330-*d*. In this example, the write error associated with page 330-*d* may have also corrupted page 330-*a* and 330-*b*, but not page 330-*c*.

After determining that a write error has occurred at page 330-*d*, memory device may indicate the error to host device 305 (e.g., by sending an indication of the error). The indication of the error may include an address of page 330-*d* and a size of the error. The size of the error may include, for example, the cumulative size of pages impacted by the error (e.g., pages 330-*a*, 330-*b*, and 330-*d*) along with any intervening pages (e.g., page 330-*c*). That is, memory device 310 may determine the size of the error based on the span of pages from the page at which the write error occurs (page 330-*d*) to the earliest corrupted page (page 330-*a*). Additionally or alternatively, the indication of the error may include the addresses of each page for which replacement data is desired (e.g., the addresses of pages 330-*a*, 330-*b*, 330-*c*, and 330-*d*) and may or may not also include a size of each such page.

Host device 305 may receive the indication of the error and may transmit a copy of Data1 340-*a*, Data2 340-*b*, Data3 340-*c*, and Data4 340-*d* to memory device 310 based on the indication of the error (e.g., based on the address and the size). For example, host device 305 may send one or more write commands to memory device 310 including one or more of Data1 340-*a*, Data2 340-*b*, Data3 340-*c*, and Data4 340-*d*.

Memory device 310 may re-write Data1 340-*a*, Data2 340-*b*, Data3 340-*c*, and Data4 340-*d* to pages 330-*e*, 330-*f*, 330-*g*, and 330-*h*, respectively, of block 325-*b*. In some cases, memory device 310 may re-write the data by using internal buffer 320 as a ping-pong buffer and re-writing each of Data1 340-*a*, Data2 340-*b*, Data3 340-*c*, and Data4 340-*d* from internal buffer 320 to block 325-*b*. In some cases, block 325-*b* may be a memory block that was previously erased by memory device 310 and is therefore available for writing.

Figure 5:
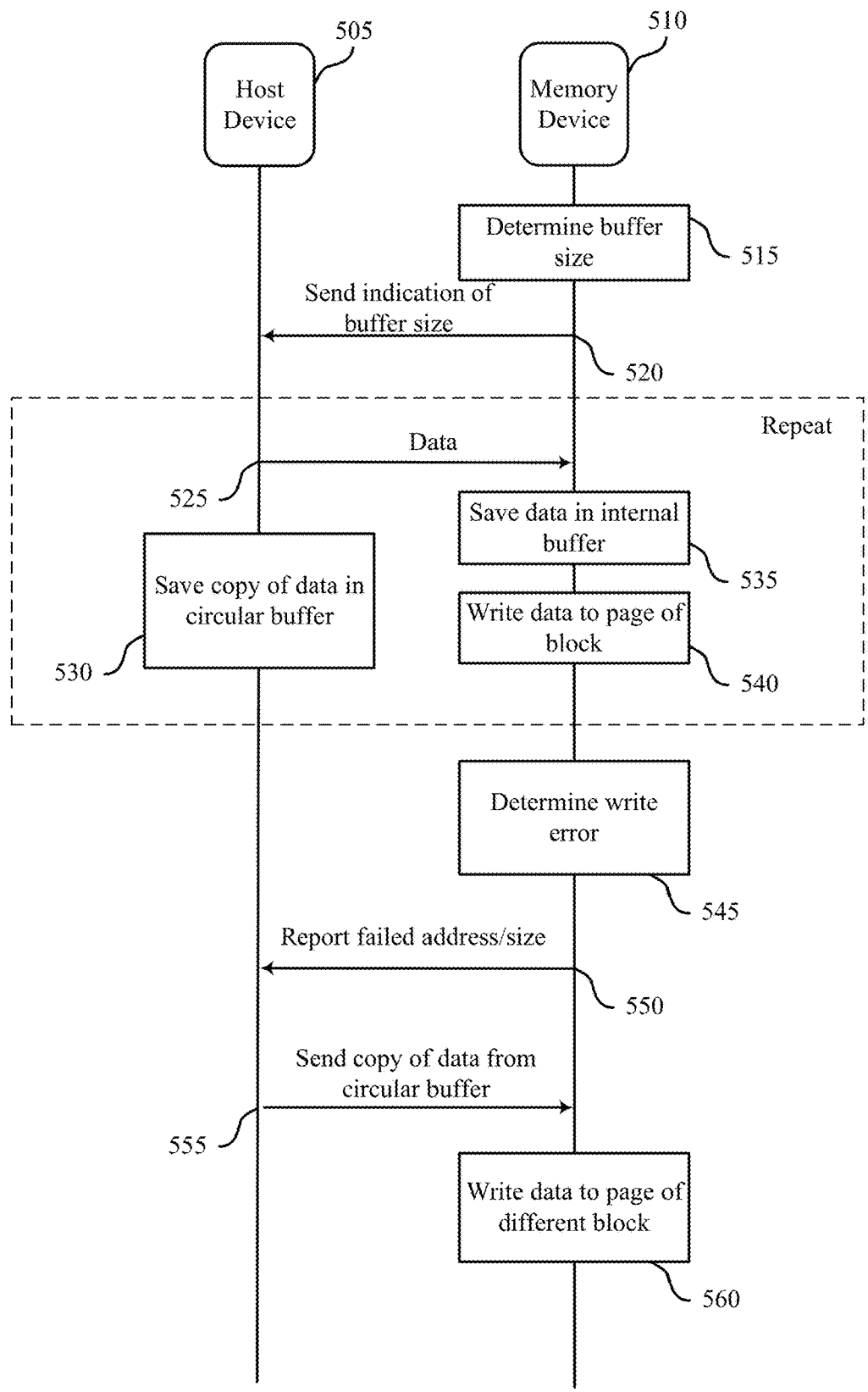
FIG. 5 illustrates an example of a process flow that supports data recovery management for memory in accordance with examples as disclosed herein.

FIG. 5 illustrates a process flow 500 that supports data recovery management for memory in accordance with examples as disclosed herein. Process flow 500 may be performed by a host device 505 and a memory device 510, which may be examples of host device 305 and memory device 310 described with reference to FIGS. 3A, 3B, and 4.

At 515, memory device 510 may determine a size of a buffer for the host device 505 to maintain. In some cases, memory device 510 may determine the size of the buffer based on the maximum number of pages operable to be impacted by a write operation of memory device 510. In some cases, memory device 510 may determine the size of the buffer further based on a size of an internal buffer of memory device 510 (such as internal buffer 320 described with reference to FIG. 3).

At 520, memory device 510 may transmit an indication of the size of the buffer to host device 505. In some cases, memory device 510 may transmit the indication of the size of the buffer during an initialization procedure, such as in response to receiving an initialization command or in response to being powered up. In some cases, host device 505 may then initialize (e.g., configure, set up) a circular buffer having the indicated buffer size.

At 525, host device 505 may identify data to be written by memory device 510 and may transmit the data to memory device 510, such as by transmitting a write command that includes the data.

At 530, host device 505 may save a copy of the data in a circular buffer.

At 535, memory device 510 may save the data in an internal buffer of memory device 510, such as a ping-pong buffer, in preparation for writing the data to a page of memory.

At 540, memory device 510 may write the data to a page of memory device 510.

The operations of 525, 530, 535, and 540 may be repeated as host device 505 continues to identify new data to be written to memory device 510.

At 545, memory device 510 may attempt to write data to a page and may determine that there has been a write error.

At 550, memory device 510 may identify an address and a size associated with the write error, and may transmit an indication of the address and size to the host device 505. For example, the address may be an address of a page of a block at which the write error occurred, and the size may be, for example, a number of pages, a cumulative size of a number of pages, or an amount of data that may need to be re-written due to (e.g., based on) the write error.

At 555, the host device may receive the address and size and may send some or all of the data in the circular buffer to memory device 510.

At 560, memory device 510 may write the data received from host device 505 to one or more pages of a different block of memory device 510.

Figure 6:
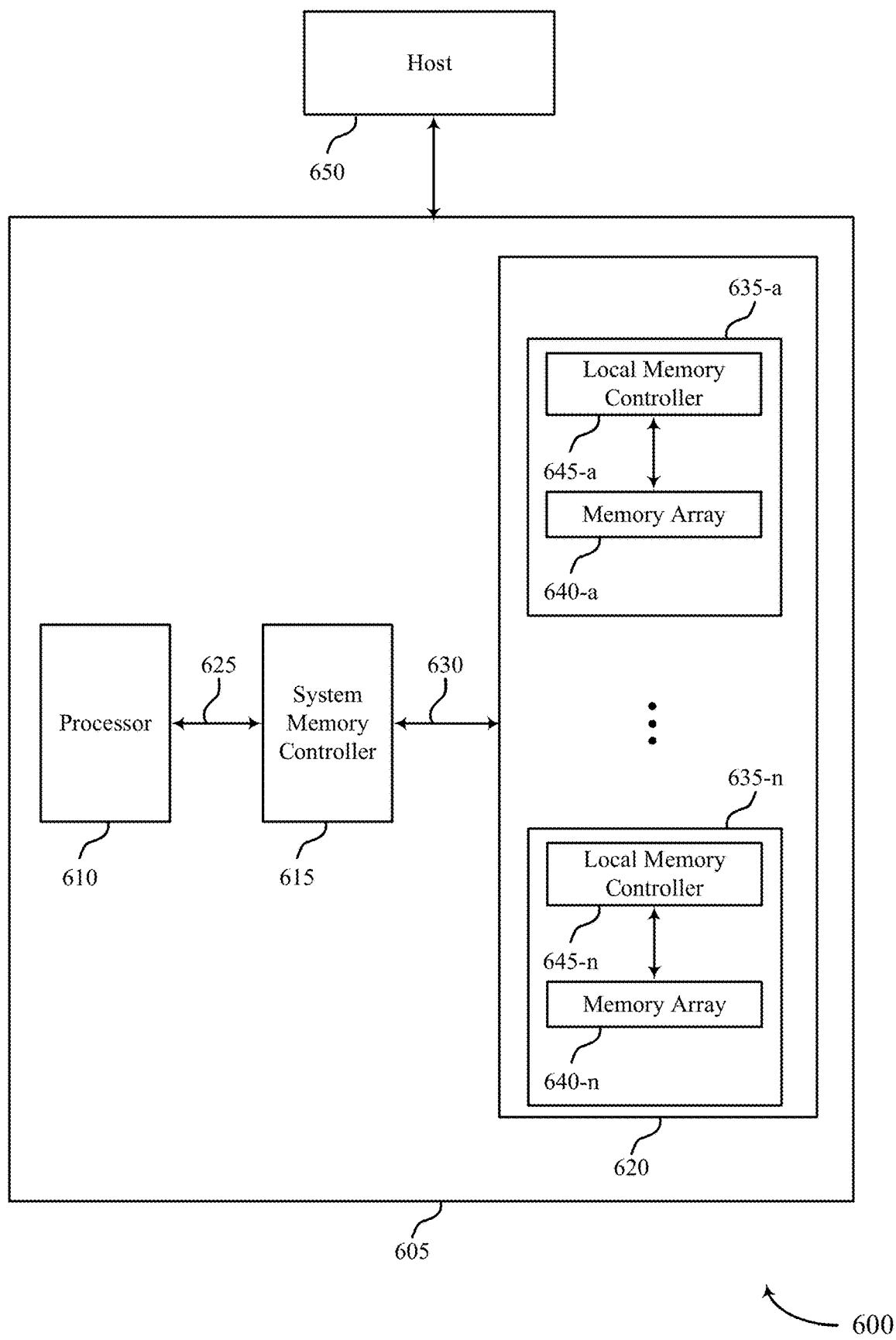
FIG. 6 illustrates an example of a system that supports data recovery management for memory in accordance with examples as disclosed herein.

FIG. 6 shows a diagram of a system 600 that supports data recovery management for memory in accordance with examples of the present disclosure. System 600 may include a device 605 that may include a processor 610, a system memory controller 615, and a memory device 620. Memory device 620 may be an example of memory device 100, for example. Processor 610 may be configured to operate in coordination with system memory controller 615 via bus 625. System memory controller 615 may be configured to operate with processor 610 and memory device 620 via buses 625, 630.

In some examples, memory device 620 may include one or more memory arrays 640, each of which may be coupled with a corresponding local memory controller 645. In some cases, memory arrays 640 may be arrays of NAND memory cells, for example. In some cases, the operations described with reference to FIGS. 3, 4 and 5 may be performed by local memory controllers 645 and/or system memory controller 615. In some cases, device 605 may be coupled with a host device 650, such as an external memory controller.

The local memory controller 645 may be configured to control operations of the memory array 640. Also, the local memory controller 645 may be configured to communicate (e.g., receive and transmit data and/or commands) with the system memory controller 615. The local memory controller 645 may support the system memory controller 615 to control operation of the memory device 620 as described herein. In some cases, the memory device 620 does not include a system memory controller 615, and the local memory controller 645 a host device 650 may perform the various functions described herein. As such, the local memory controller 645 may be configured to communicate with the system memory controller 615, with other local memory controllers 645, or directly with the host device 650.

In some examples, memory device 620 may attempt to write data to a page in a block of memory array 640 and may determine a write error. Memory device 620 may indicate the error to host device 650. Host device 650 may, based on the indication of the error, send a backup copy of data previously written to one or more pages in the block of memory array 640. Memory device 620 may write the copy of the data to one or more pages in a different block of memory array 640. Host device 650 may maintain a circular buffer for keeping backup copies of data transmitted to memory device 620. In some cases, the size of the circular buffer may be indicated, to host device 650, by memory device 620.

Figure 7:
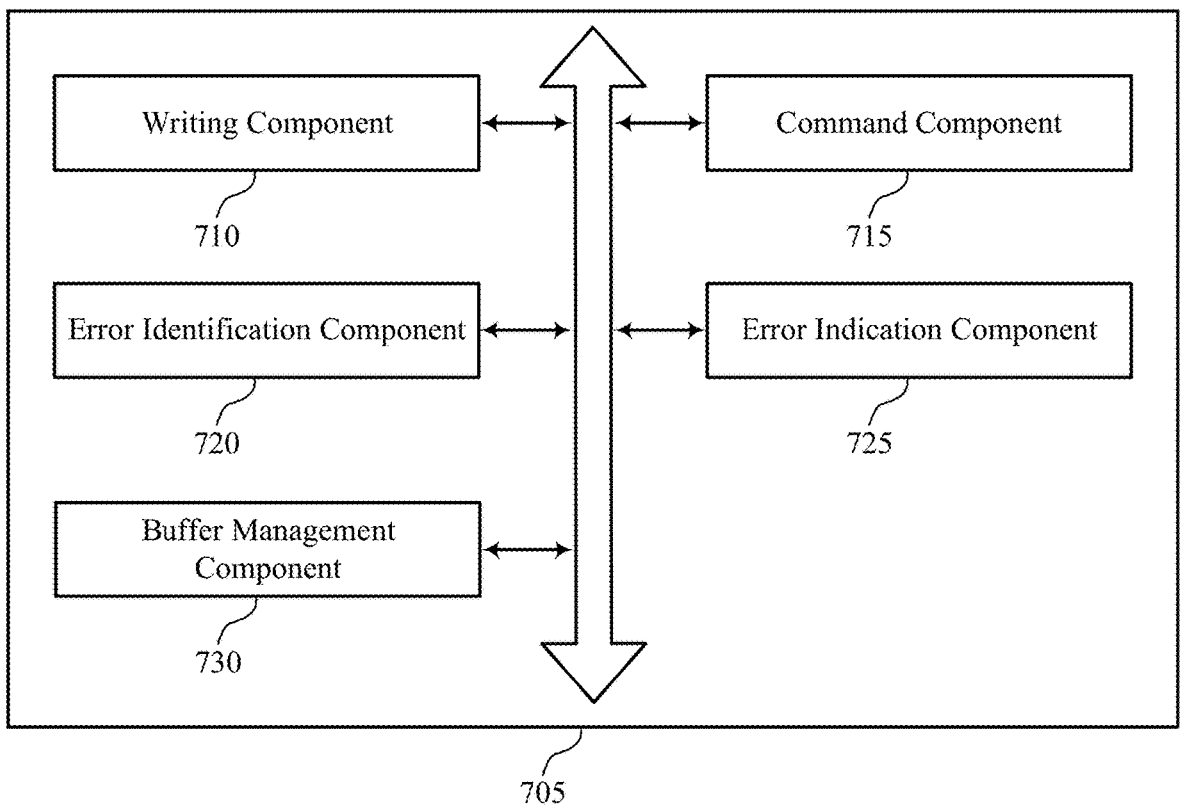
FIG. 7 illustrates an example of a block diagram that supports data recovery management for memory in accordance with examples as disclosed herein.

FIG. 7 shows a block diagram 700 of a memory device 705 that supports data recovery management for memory in accordance with aspects of the present disclosure. The memory device 705 may be an example of aspects of a memory device 100 described herein. The memory device 705 may include a writing component 710, a command component 715, an error identification component 720, an error indication component 725, and a buffer management component 730. Each of these modules may communicate, directly or indirectly, with one another (e.g., via one or more buses).

The writing component 710 may write first data to a first page of memory cells within a first set of pages of memory cells at the memory device. The command component 715 may receive, from a host device, a write command for second data. In some examples, the writing component 710 may attempt to write second data to a second page of memory cells within the first set of pages. The error identification component 720 may identify an error associated with attempting to write the second data to the second page within the first set of pages. The error indication component 725 may indicate the error to the host device.

In some examples, the command component 715 may receive, from the host device after indicating the error, a copy of the first data and a copy of the second data. In some examples, the writing component 710 may write the copy of the first data to a first page of memory cells within a second set of pages of memory cells at the memory device and the copy of the second data to a second page of memory cells within the second set of pages.

In some examples, indicating the error to the host device includes indicating an address of the second page and an error size representing a number of pages to be re-written based on identifying the error.

In some examples, the error identification component 720 may determine that the first page is impacted by the error. In some examples, the error indication component 725 may determine the error size based on determining that first page is impacted by the error.

In some examples, the writing component 710 may write third data to a third page of memory cells within the first set of pages of memory cells after writing the first data and before attempting to write the second data, where the pages to be re-written includes the first page, the second page, and the third page. In some examples, the writing component 710 may receive, from the host device after indicating the error, a copy of the third data. In some examples, the writing component 710 may write the copy of the third data to a third page of memory cells within a second set of pages. In some cases, the third page of memory cells is not impacted by the error.

In some examples, the buffer management component 730 may determine a size of a buffer for the host device to maintain based at least in part on a maximum number of pages within the first set of pages operable to be impacted by a write error for one page of the first set of pages. In some examples, the buffer management component 730 may indicate, to the host device, the size of the buffer for the host device to maintain.

In some examples, the writing component 710 may write the first data to a portion of an internal buffer at the memory device before writing the first data to the first page, where the portion of the internal buffer at the memory device is configured to buffer data received from the host device, and may write the second data to the portion of the internal buffer at the memory device before attempting to write the second data to the second page within the first set of pages. In some examples, the size of the buffer for the host device to maintain is based at least in part on a capacity of the portion of the internal buffer.

In some examples, the command component 715 may receive an initialization command for the memory device, where indicating the size of the buffer for the host device to maintain is based on receiving the initialization command.

In some examples, the writing component 710 may allocate the first page for the first data based on receiving the initialization command, where, at a time between allocating the first page and writing the first data to the first page, the first set of pages is empty.

In some cases, the memory device includes not-and (NAND) memory cells. In some cases, the first set of pages is a first block of NAND memory cells. In some cases, the second set of pages is a second block of NAND memory cells.

Figure 8:
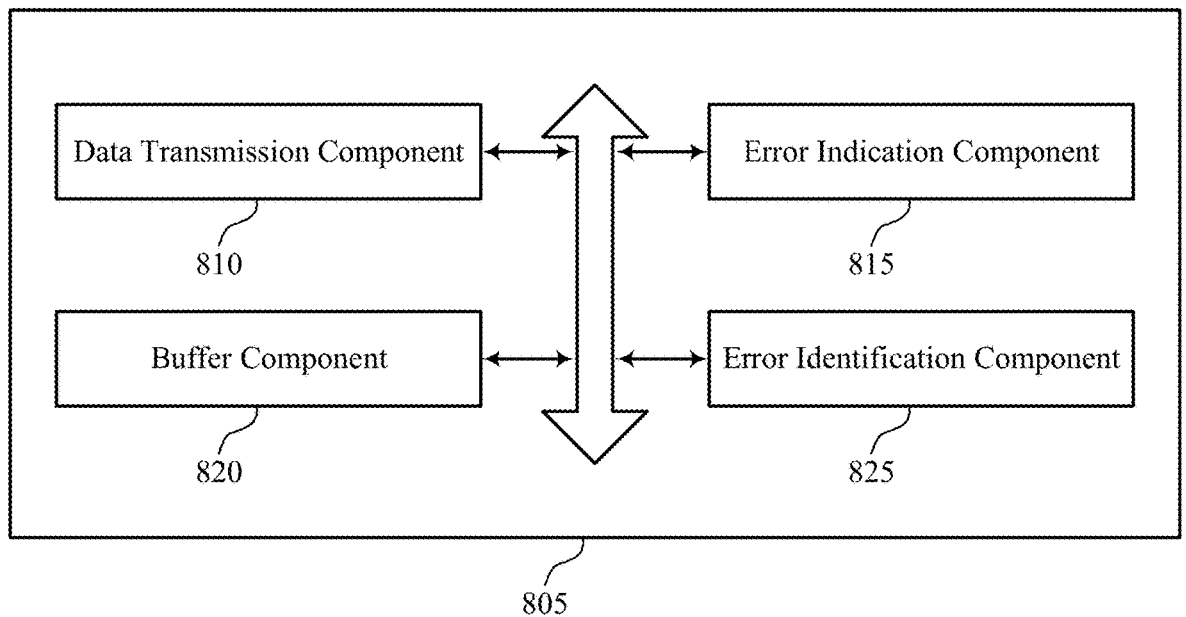
FIG. 8 illustrates an example of a block diagram that supports data recovery management for memory in accordance with examples as disclosed herein.

FIG. 8 shows a block diagram 800 of a host device 805 that supports data recovery management for memory in accordance with aspects of the present disclosure. The host device 805 may be an example of aspects of a host device 305, for example. The host device 805 may include a data transmission component 810, an error indication component 815, a buffer component 820, and an error identification component 825. Each of these modules may communicate, directly or indirectly, with one another (e.g., via one or more buses).

The data transmission component 810 may transmit first data to a memory device. In some examples, the data transmission component 810 may transmit second data to the memory device. In some examples, transmitting the first data to the memory device includes transmitting a write command including the first data, and transmitting the second data to the memory device includes transmitting a write command including the second data.

The error indication component 815 may receive, from the memory device, an indication of an error associated with the second data. The buffer component 820 may obtain, from a buffer external to the memory device and based on the indication of the error, a copy of the second data and a copy of the first data. The data transmission component 810 may transmit, to the memory device based on receiving an indication of an error, a copy of the first data and a copy of the second data.

The error identification component 825 may receive an indication of an address and an error size, where obtaining the copy of the second data and the copy of the first data is based on the indication of the address and the error size.

In some examples, the buffer component 820 may receive, from the memory device, an indication of a size of the buffer. In some examples, the buffer component 820 may configure the buffer to have the indicated size, where obtaining the copy of the first data and the copy of the second data is based on configuring the buffer to have the indicated size.

In some examples, the buffer component 820 may initialize the memory device, where receiving the indication of the size of the buffer is based on initializing the memory device.

In some examples, the buffer component 820 may write the first data to the buffer based on transmitting the first data to the memory device. In some examples, the buffer component 820 may write the second data to the buffer based on transmitting the second data to the memory device.

In some examples, transmitting the first data to the memory device includes transmitting a write command for the first data, and transmitting the second data to the memory device includes transmitting a write command for the second data.

In some cases, the size of the buffer is based on a block size for the memory device, a page size for the memory device, a size of at least a portion of an internal buffer (e.g., RAM buffer) at the memory device, or any combination thereof.

In some examples, the host device 805 may determine, based on the indication of the error, an amount of data to obtain from the buffer, where obtaining the copy of the first data and the copy of the second data includes obtaining the amount of data from the buffer.

In some cases, the buffer includes a circular buffer (e.g., at the host device).

Figure 9:
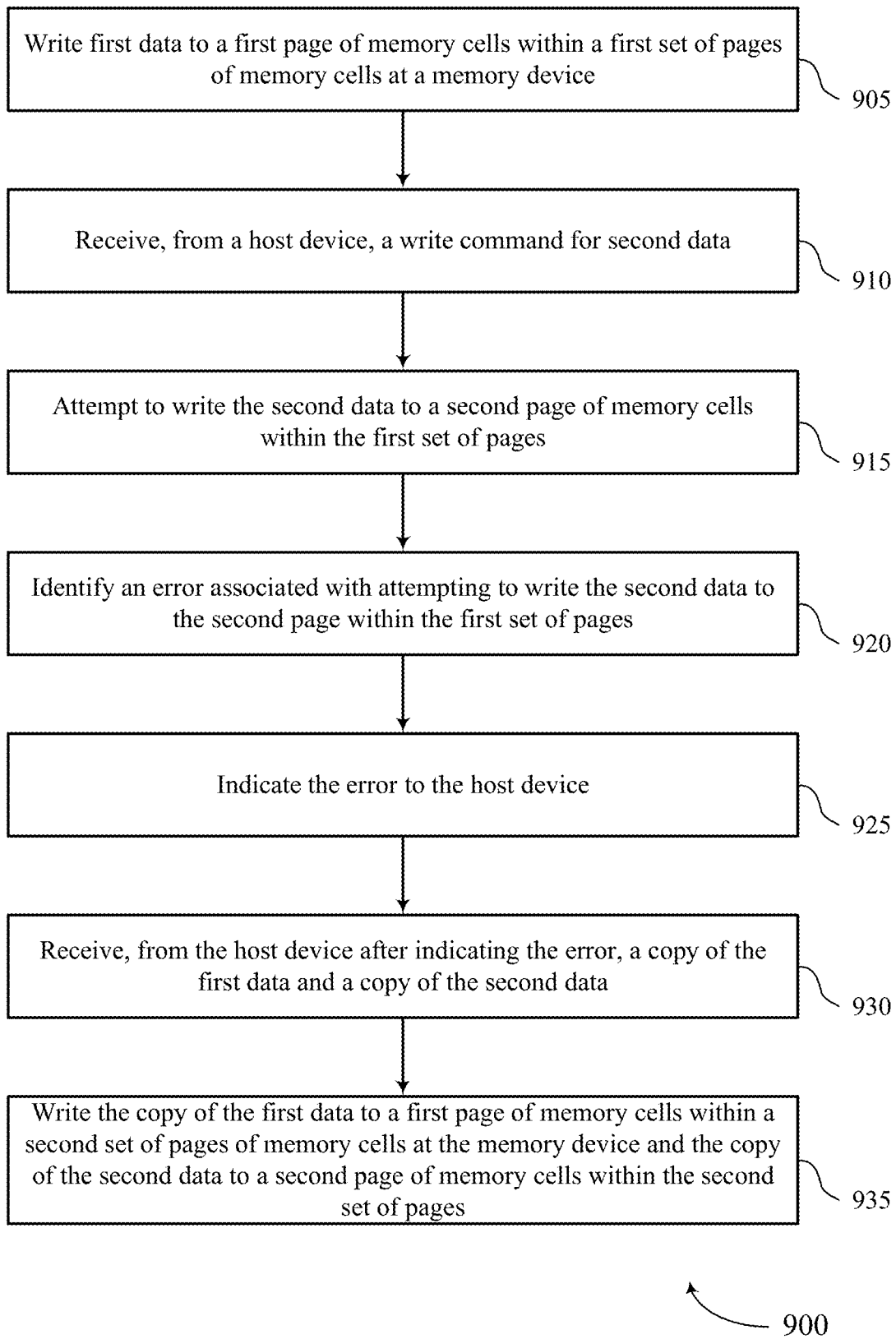
FIGS. 9 and 10 show flowcharts illustrating a method or methods that support data recovery management for memory in accordance with examples as disclosed herein.

FIG. 9 shows a flowchart illustrating a method 900 that supports data recovery management for memory in accordance with aspects of the present disclosure. The operations of method 900 may be implemented by a memory device 100 or its components as described herein. For example, the operations of method 900 may be performed by a memory device as described with reference to FIGS. 2 through 5. In some examples, a memory device may execute a set of instructions to control the functional elements of the memory device to perform the functions described below. Additionally or alternatively, a memory device may perform aspects of the functions described below using special-purpose hardware.

At 905, the memory device may write first data to a first page of memory cells within a first set of pages of memory cells at a memory device. The operations of 905 may be performed according to the methods described herein. In some examples, aspects of the operations of 905 may be performed by a writing component as described with reference to FIG. 7.

At 910, the memory device may receive, from a host device, a write command for second data. The operations of 910 may be performed according to the methods described herein. In some examples, aspects of the operations of 910 may be performed by a command component as described with reference to FIG. 7.

At 915, the memory device may attempt to write the second data to a second page of memory cells within the first set of pages. The operations of 915 may be performed according to the methods described herein. In some examples, aspects of the operations of 915 may be performed by a writing component as described with reference to FIG. 7.

At 920, the memory device may identify an error associated with attempting to write the second data to the second page within the first set of pages. The operations of 920 may be performed according to the methods described herein. In some examples, aspects of the operations of 920 may be performed by an error identification component as described with reference to FIG. 7.

At 925, the memory device may indicate the error to the host device. The operations of 925 may be performed according to the methods described herein. In some examples, aspects of the operations of 925 may be performed by an error indication component as described with reference to FIG. 7.

At 930, the memory device may receive, from the host device after indicating the error, a copy of the first data and a copy of the second data. The operations of 930 may be performed according to the methods described herein. In some examples, aspects of the operations of 930 may be performed by a command component as described with reference to FIG. 7.

At 935, the memory device may write the copy of the first data to a first page of memory cells within a second set of pages of memory cells at the memory device and the copy of the second data to a second page of memory cells within the second set of pages. The operations of 935 may be performed according to the methods described herein. In some examples, aspects of the operations of 935 may be performed by a writing component as described with reference to FIG. 7.

In some examples, an apparatus as described herein may perform a method or methods, such as the method 700. The apparatus may include features, means, or instructions (e.g., a non-transitory computer-readable medium storing instructions executable by a processor) for writing first data to a first page of memory cells within a first set of pages of memory cells at a memory device, receiving, from a host device, a write command for second data, attempting to write the second data to a second page of memory cells within the first set of pages, identifying an error associated with attempting to write the second data to the second page within the first set of pages, indicating the error to the host device, receiving, from the host device after indicating the error, a copy of the first data and a copy of the second data, and writing the copy of the first data to a first page of memory cells within a second set of pages of memory cells at the memory device and the copy of the second data to a second page of memory cells within the second set of pages.

In some examples of the method 700 and the apparatus described herein, indicating the error to the host device may include indicating an address of the second page and an error size representing a number of pages to be re-written based on identifying the error.

Some examples of the method 700 and the apparatus described herein may further include operations, features, means, or instructions for determining that the first page is impacted by the error, and determining the error size based at least in part on determining that first page is impacted by the error.

Some examples of the method 700 and the apparatus described herein may further include operations, features, means, or instructions for writing third data to a third page of memory cells within the first set of pages of memory cells after writing the first data and before attempting to write the second data, where the pages to be re-written include the first page, the second page, and the third page, receiving, from the host device after indicating the error, a copy of the third data, and writing the copy of the third data to a third page of memory cells within the second set of pages. In some examples of the method 700 and the apparatus described herein, the third page of memory cells is not impacted by the error.

Some examples of the method 700 and the apparatus described herein may further include operations, features, means, or instructions for determining a size of a buffer for the host device to maintain based at least in part on a maximum number of pages within the first set of pages operable to be impacted by a write error for one page of the first set of pages, and indicating, to the host device, the size of the buffer for the host device to maintain.

Some examples of the method 700 and the apparatus described herein may further include operations, features, means, or instructions for writing the first data to a portion of an internal buffer at the memory device before writing the first data to the first page, where the portion of the internal buffer at the memory device is configured to buffer data received from the host device, and writing the second data to the portion of the internal buffer at the memory device before attempting to write the second data to the second page within the first set of pages, where the size of the buffer for the host device to maintain is based at least in part on a capacity of the portion of the internal buffer.

Some examples of the method 700 and the apparatus described herein may further include operations, features, means, or instructions for receiving an initialization command for the memory device, where indicating the size of the buffer for the host device to maintain is based at least in part on receiving the initialization command.

Some examples of the method 700 and the apparatus described herein may further include operations, features, means, or instructions for allocating the first page for the first data based at least in part on receiving the initialization command, where, at a time between allocating the first page and writing the first data to the first page, the first set of pages is empty.

Figure 10:
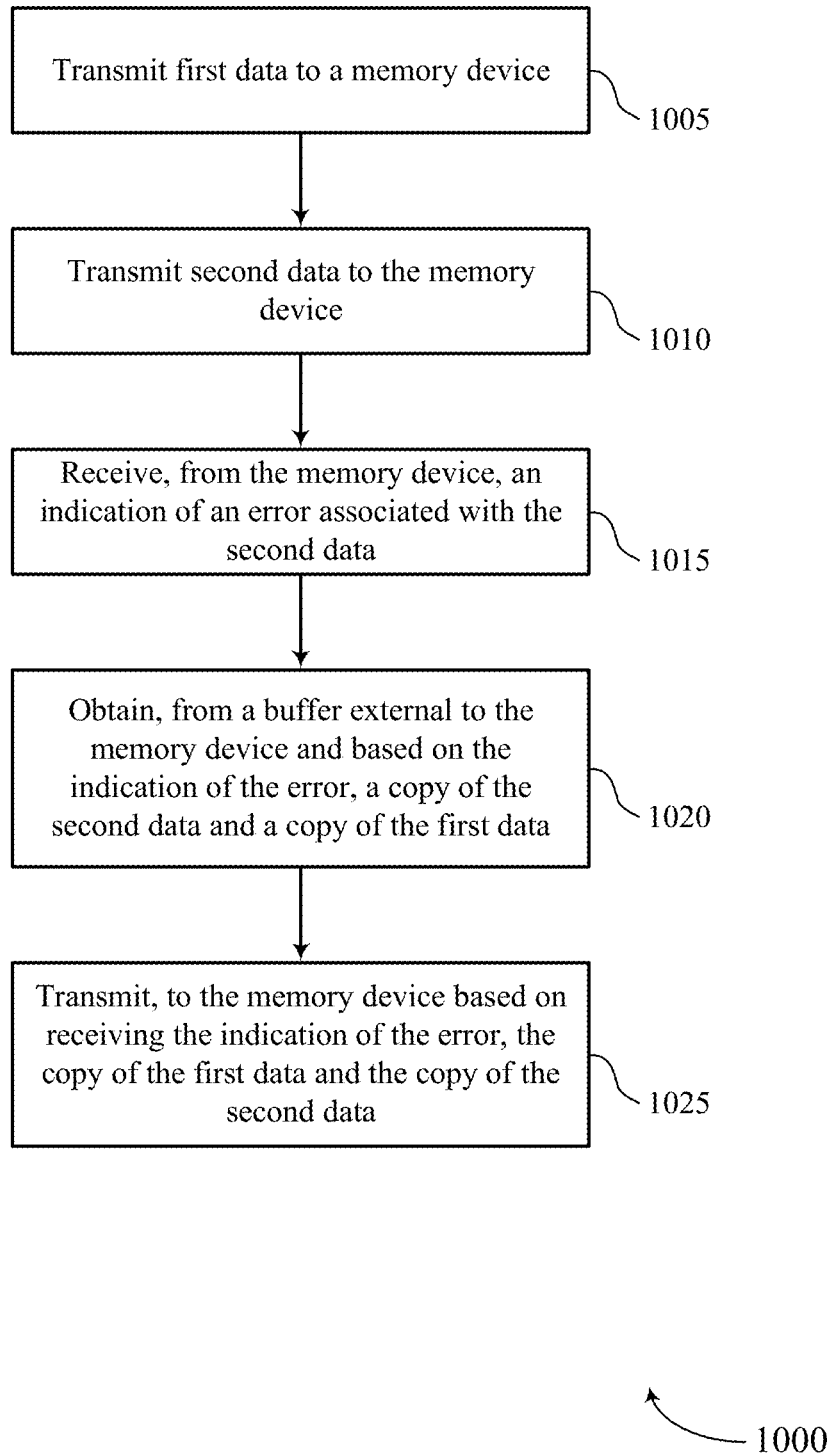

In some examples of the method 700 and the apparatus described herein, the memory device includes not-and (NAND) memory cells, the first set of pages is a first block of NAND memory cells, and the second set of pages is a second block of NAND memory cells FIG. 10 shows a flowchart illustrating a method 1000 that supports data recovery management for memory in accordance with aspects of the present disclosure. The operations of method 1000 may be implemented by a host device 305 or its components as described herein. In some examples, a host device may execute a set of instructions to control the functional elements of the host device to perform the functions described below. Additionally or alternatively, a host device may perform aspects of the functions described below using special-purpose hardware.

At 1005, the host device may transmit first data to a memory device. The operations of 1005 may be performed according to the methods described herein. In some examples, aspects of the operations of 1005 may be performed by a data transmission component as described with reference to FIG. 8.

At 1010, the host device may transmit second data to the memory device. The operations of 1010 may be performed according to the methods described herein. In some examples, aspects of the operations of 1010 may be performed by a data transmission component as described with reference to FIG. 8.

At 1015, the host device may receive, from the memory device, an indication of an error associated with the second data. The operations of 1015 may be performed according to the methods described herein. In some examples, aspects of the operations of 1015 may be performed by an error indication component as described with reference to FIG. 8.

At 1020, the host device may obtain, from a buffer external to the memory device and based on the indication of the error, a copy of the second data and a copy of the first data. The operations of 1020 may be performed according to the methods described herein. In some examples, aspects of the operations of 1020 may be performed by a buffer component as described with reference to FIG. 8.

At 1025, the host device may transmit, to the memory device based on receiving the indication of the error, the copy of the first data and the copy of the second data. The operations of 1025 may be performed according to the methods described herein. In some examples, aspects of the operations of 1025 may be performed by a data transmission component as described with reference to FIG. 8.

In some examples, an apparatus as described herein may perform a method or methods, such as the method 800. The apparatus may include features, means, or instructions (e.g., a non-transitory computer-readable medium storing instructions executable by a processor) for transmitting first data to a memory device, transmitting second data to the memory device, receiving, from the memory device, an indication of an error associated with the second data, obtaining, from a buffer external to the memory device and based at least in part on the indication of the error, a copy of the second data and a copy of the first data, transmitting, to the memory device based at least in part on receiving the indication of the error, the copy of the first data and the copy of the second data.

In some examples of the method 800 and the apparatus described herein, receiving the indication of the error includes receiving an indication of an address and an error size, where obtaining the copy of the second data and the copy of the first data is based at least in part on the indication of the address and the error size.

Some examples of the method 800 and the apparatus described herein may further include operations, features, means, or instructions for receiving, from the memory device, an indication of a size of the buffer, and configuring the buffer to have the indicated size, where obtaining the copy of the first data and the copy of the second data is based at least in part on configuring the buffer to have the indicated size.

Some examples of the method 800 and the apparatus described herein may further include operations, features, means, or instructions for initializing the memory device, where receiving the indication of the size of the buffer is based at least in part on initializing the memory device.

Some examples of the method 800 and the apparatus described herein may further include operations, features, means, or instructions for writing the first data to the buffer based at least in part on transmitting the first data to the memory device, and writing the second data to the buffer based at least in part on transmitting the second data to the memory device.

In some examples of the method 800 and the apparatus described herein, transmitting the first data to the memory device includes transmitting a write command for the first data, and transmitting the second data to the memory device includes transmitting a write command for the second data.

In some examples of the method 800 and the apparatus described herein, the size of the buffer is based at least in part on a block size for the memory device, a page size for the memory device, a size of at least a portion of an internal buffer at the memory device, or any combination thereof.

In some examples of the method 800 and the apparatus described herein, the buffer is a circular buffer (e.g., at the host device).

It should be noted that the methods described herein are possible implementations, and that the operations and the steps may be rearranged or otherwise modified and that other implementations are possible. Furthermore, portions from two or more of the methods may be combined.

An apparatus is described. The apparatus may include a first set of memory cells, a second set of memory cells, and a controller coupled with the first set of memory cells and the second set of memory cells. The controller may be operable to cause the apparatus to identify an error associated with attempting to write new data to the first set of memory cells, indicate the error to a host device, receive, from the host device based at least in part on indicating the error, a copy of the new data and a copy of other data previously written to the first set of memory cells, and write the copy of the new data and the copy of the other data to the second set of memory cells.

In some examples, the controller may be further operable to cause the apparatus to indicate, to the host device, a size of a buffer for the host device to maintain to support receiving the copy of the new data and the copy of the other data.

Some examples may further include an internal RAM buffer, where the size of the buffer for the host device to maintain is based at least in part on a maximum number of memory cells that may be impacted by a write error associated with the first set of memory cells, a capacity of a portion of the internal RAM buffer, or both.

Some examples may further include a plurality of sets of memory cells that includes the first set of memory cells and the second set of memory cells, wherein each of the plurality of sets of memory cells comprises a block of NAND (e.g. NAND Flash) memory cells.

In some examples, the controller may be further operable to cause the apparatus to write the new data to the portion of the internal RAM buffer before attempting to write the new data to the first set of memory cells.

In some examples, the controller may be further operable to cause the apparatus to identify an initialization event for the apparatus, wherein indicating the size of the buffer for the host device to maintain is based at least in part on identifying the initialization event.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

As used herein, the term "virtual ground" refers to a node of an electrical circuit that is held at a voltage of approximately zero volts (0V) but that is not directly coupled with ground. Accordingly, the voltage of a virtual ground may temporarily fluctuate and return to approximately 0V at steady state. A virtual ground may be implemented using various electronic circuit elements, such as a voltage divider consisting of operational amplifiers and resistors. Other implementations are also possible. "Virtual grounding" or "virtually grounded" means connected to approximately 0V.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some cases, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals can be communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components from one another, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The devices discussed herein, including a memory device, may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOS), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
    writing first data to a first page of memory cells within a first set of pages of memory cells at a memory device;
    receiving, from a host device, a write command for second data;
    attempting to write the second data to a second page of memory cells within the first set of pages;
    identifying an error associated with attempting to write the second data to the second page within the first set of pages;
    indicating the error to the host device;
    receiving, from the host device after indicating the error, a copy of the first data and a copy of the second data; and
    writing the copy of the first data to a first page of memory cells within a second set of pages of memory cells at the memory device and the copy of the second data to a second page of memory cells within the second set of pages.

2. The method of claim 1, wherein indicating the error to the host device comprises indicating an address of the second page and an error size representing a number of pages to be re-written based on identifying the error.

3. The method of claim 2, further comprising:
    determining that the first page is impacted by the error; and
    determining the error size based at least in part on determining that first page is impacted by the error.

4. The method of claim 3, further comprising:
    writing third data to a third page of memory cells within the first set of pages of memory cells after writing the first data and before attempting to write the second data, wherein the pages to be re-written comprise the first page, the second page, and the third page;
receiving, from the host device after indicating the error, a copy of the third data; and
writing the copy of the third data to a third page of memory cells within the second set of pages.

5. The method of claim 4, wherein the third page of memory cells is not impacted by the error.

6. The method of claim 1, further comprising:
determining a size of a buffer for the host device to maintain based at least in part on a maximum number of pages within the first set of pages operable to be impacted by a write error for one page of the first set of pages; and
indicating, to the host device, the size of the buffer for the host device to maintain.

7. The method of claim 6, further comprising:
writing the first data to a portion of an internal buffer at the memory device before writing the first data to the first page, wherein the portion of the internal buffer at the memory device is configured to buffer data received from the host device; and
writing the second data to the portion of the internal buffer at the memory device before attempting to write the second data to the second page within the first set of pages, wherein
the size of the buffer for the host device to maintain is based at least in part on a capacity of the portion of the internal buffer.

8. The method of claim 6, further comprising:
receiving an initialization command for the memory device, wherein indicating the size of the buffer for the host device to maintain is based at least in part on receiving the initialization command.

9. The method of claim 8, further comprising:
allocating the first page for the first data based at least in part on receiving the initialization command, wherein, at a time between allocating the first page and writing the first data to the first page, the first set of pages is empty.

10. The method of claim 1, wherein:
the memory device comprises not-and (NAND) memory cells;
the first set of pages comprises a first block of NAND memory cells; and
the second set of pages comprises a second block of NAND memory cells.

11. A method, comprising:
transmitting first data to a memory device;
transmitting second data to a memory device;
receiving, from the memory device, an indication of an error associated with the second data;
obtaining, from a buffer external to the memory device and based at least in part on the indication of the error, a copy of the second data and a copy of the first data; and
transmitting, to the memory device based at least in part on receiving the indication of the error, the copy of the first data and the copy of the second data.

12. The method of claim 11, wherein receiving the indication of the error comprises:
receiving an indication of an address and an error size, wherein obtaining the copy of the second data and the copy of the first data is based at least in part on the indication of the address and the error size.

13. The method of claim 11, further comprising:
receiving, from the memory device, an indication of a size of the buffer; and
configuring the buffer to have the indicated size, wherein obtaining the copy of the first data and the copy of the second data is based at least in part on configuring the buffer to have the indicated size.

14. The method of claim 13, further comprising:
initializing the memory device, wherein receiving the indication of the size of the buffer is based at least in part on initializing the memory device.

15. The method of claim 13, further comprising:
writing the first data to the buffer based at least in part on transmitting the first data to the memory device; and
writing the second data to the buffer based at least in part on transmitting the second data to the memory device.

16. The method of claim 13, wherein transmitting the first data to the memory device comprises transmitting a write command for the first data, and wherein transmitting the second data to the memory device comprises transmitting a write command for the second data.

17. The method of claim 13, wherein:
the size of the buffer is based at least in part on a block size for the memory device, a page size for the memory device, a size of at least a portion of an internal buffer at the memory device, or any combination thereof.

18. The method of claim 11, further comprising:
determining, based at least in part on the indication of the error, an amount of data to obtain from the buffer, wherein obtaining the copy of the first data and the copy of the second data comprises obtaining the amount of data from the buffer.

19. The method of claim 11, wherein the buffer comprises a circular buffer.

20. An apparatus, comprising:
a first set of memory cells,
a second set of memory cells, and
a controller coupled with the first set of memory cells and the second set of memory cells, the controller operable to cause the apparatus to:
identify an error associated with attempting to write new data to the first set of memory cells;
indicate the error to a host device;
receive, from the host device based at least in part on indicating the error, a copy of the new data and a copy of other data previously written to the first set of memory cells; and
write the copy of the new data and the copy of the other data to the second set of memory cells.

21. The apparatus of claim 20, wherein the controller is further operable to cause the apparatus to:
indicate, to the host device, a size of a buffer for the host device to maintain to support receiving the copy of the new data and the copy of the other data.

22. The apparatus of claim 21, further comprising:
an internal random access memory (RAM) buffer, wherein the size of the buffer for the host device to maintain is based at least in part on a maximum number of memory cells that may be impacted by a write error associated with the first set of memory cells, a capacity of a portion of the internal RAM buffer, or both.

23. The apparatus of claim 22, further comprising:
a plurality of sets of memory cells that includes the first set of memory cells and the second set of memory cells, wherein each of the plurality of sets of memory cells comprises a block of not-and (NAND) memory cells.

24. The apparatus of claim 22, wherein the controller is further operable to cause the apparatus to:
   write the new data to the portion of the internal RAM buffer before attempting to write the new data to the first set of memory cells.

25. The apparatus of claim 21, wherein the controller is further operable to cause the apparatus to:
   identify an initialization event for the apparatus, wherein indicating the size of the buffer for the host device to maintain is based at least in part on identifying the initialization event.

* * * * *